United States Patent
Menon et al.

(10) Patent No.: US 11,741,541 B2
(45) Date of Patent: Aug. 29, 2023

(54) COMPUTER NETWORK IN WHICH DIGITAL TOKENS ARE CREATED AND ROUTED TO A DESTINATION NODE ACCORDING TO RULES CONFIGURED IN EACH NODE OF THE COMPUTER NETWORK

(71) Applicant: TallyX, Inc., Princeton, NJ (US)

(72) Inventors: Aditya D. Menon, East Windsor, NJ (US); Yean Whei Tseng, West Windsor, NJ (US); Suryanarayana Narasimha, Edison, NJ (US); Venkatesh P. Krishnamurthy, Monmouth Junction, NJ (US)

(73) Assignee: TallyX, Inc., Princeton, NJ (US)

( * ) Notice: Subject to any disclaimer, the term of this patent is extended or adjusted under 35 U.S.C. 154(b) by 0 days.

(21) Appl. No.: 17/115,479

(22) Filed: Dec. 8, 2020

(65) Prior Publication Data

US 2022/0180432 A1 Jun. 9, 2022

Related U.S. Application Data

(60) Provisional application No. 63/122,366, filed on Dec. 7, 2020.

(51) Int. Cl.
*G06Q 40/04* (2012.01)
*H04L 9/40* (2022.01)
(Continued)

(52) U.S. Cl.
CPC ........... *G06Q 40/04* (2013.01); *G06F 16/182* (2019.01); *G06Q 10/10* (2013.01); *G06Q 20/389* (2013.01);
(Continued)

(58) Field of Classification Search
CPC ...... G06Q 40/04; G06Q 10/10; G06Q 20/389; G06Q 50/18; G06Q 30/04; G06F 16/182; H04L 63/20
(Continued)

(56) References Cited

U.S. PATENT DOCUMENTS

| 5,701,484 | A  | * | 12/1997 | Artsy | G06Q 10/10 |
|           |    |   |         |       | 358/402    |
| 2020/0193541 | A1 | * | 6/2020 | Barry | H04L 9/32 |
| 2020/0274712 | A1 | * | 8/2020 | Gray | H04L 9/3213 |

OTHER PUBLICATIONS

Lambert, N., Ma, Q. and Irvine, D., 2015. Safecoin: the decentralised network token. White Paper. (Year: 2015).*
(Continued)

*Primary Examiner* — Mike Anderson
*Assistant Examiner* — John O Preston
(74) *Attorney, Agent, or Firm* — Kim & Stewart LLP

(57) ABSTRACT

A digital token has a programmable field in which token type is specified. A method of creating, routing, and performing operations on digital tokens is carried out in a network having a plurality of nodes, wherein each node of the network has code executed therein to enforce rules associated with different types of the digital tokens. The method includes the steps of: creating a digital token having a programmable field from asset data and specifying a token type of the digital token in the programmable field of the digital token; routing the digital token having the specified token type through the nodes of the network to a destination node according to the rules associated with the specified token type; and when the digital token arrives at the destination node, performing an operation on the digital token and updating a record maintained at the destination node according to the operation performed.

8 Claims, 14 Drawing Sheets

(51) Int. Cl.
    G06Q 20/38     (2012.01)
    G06Q 10/10     (2023.01)
    G06F 16/182    (2019.01)
    G06Q 50/18     (2012.01)
    G06Q 30/04     (2012.01)
(52) U.S. Cl.
    CPC .............. G06Q 50/18 (2013.01); H04L 63/20 (2013.01); *G06Q 30/04* (2013.01)
(58) Field of Classification Search
    USPC .......................................................... 705/37
    See application file for complete search history.

(56)         References Cited

OTHER PUBLICATIONS

Strole, N.C., 1987. The IBM token-ring network—A Functional Overview. IEEE Network, 1(1), pp. 23-30. (Year: 1987).*

Huang, S.T. and Chen, N.S., 1993. Self-stabilizing depth-first token circulation on networks. Distributed Computing, 7(1), pp. 61-66. (Year: 1993).*
Brown, R. G. "The Corda Platform: An Introduction," May 2018, 21 pages.
Buterin, V. "A Next Generation Smart Contract & Decentralized Application Platform," White Paper, Ethereum Foundation, 2014, 36 pages.
Hearn, M. et al. "Corda: A distributed ledger," Version 1.0, Aug. 20, 2019, 73 pages.
Takenobu, T. "Ethereum EVM illustrated: exploring some mental models and implementations," Rev. 0.01.1, Mar. 2018, 116 pages.
Laurent, P. et al. "The tokenization of assets is disrupting the financial industry. Are you ready?" Inside Magazine, Issue 19, Part 02—From a core transformation/technology perspective, Oct. 2018, 7 pages.
Tallyx, Inc. "Tallyx White Paper," Version 1.0, Sep. 10, 2018, 46 pages.

* cited by examiner policy contract 372
- token type information 376
- brand information 377
- token security criteria 378
- asset batching-sub-batching criteria 379
- finance program criteria 380
- dynamic risk assessment providers 381
- network market room routing criteria 382
- maturity event processing criteria 383
- sub-token type information 384 master token 375
- identification information 393
- reference to the parties pertaining to the token 394
- reference to a policy contract 395
- token type 396
- token brand 397 digital draft type token 374
- reference to master token 385
- token type 386
- maturity date 387
- draft amount 388
- buyer's bank, drawer, payee 389
- payee discount 390
- draft splittable-mergeable 391
- drawee can make payment on drawer account 392

FIG. 3C master token in account storage 350

- Transaction Party Information 353
- Reference to Asset 354
- Currency Of Transaction 355
- Amount 356
- Date of Token 357
- Token Type 358
- Originating Client Application ID 359
- Network ID 360
- Token Owner ID 361
- Market Room ID 362 sub-token in account storage 352

- Type 363
- Token ID 364
- Master Token ID 365
- Owner ID 366
- Beneficiary Wallet Address 367
- Currency 368
- Amount 369
- Date of Issue 370
- Maturity Date 371

FIG. 3D

COMPUTER NETWORK IN WHICH DIGITAL TOKENS ARE CREATED AND ROUTED TO A DESTINATION NODE ACCORDING TO RULES CONFIGURED IN EACH NODE OF THE COMPUTER NETWORK

CROSS-REFERENCE TO RELATED APPLICATION(S)

This application claims the benefit of U.S. Provisional Application No. 63/122,366, filed Dec. 7, 2020, the entire contents of which are incorporated herein by reference.

BACKGROUND

In general, a digital token is a piece of data that represents something else. An asset-backed digital token is a piece of data that represents a tradeable asset and which may be traded in place of the asset. The benefits of trading with digital tokens in place of the assets include increased liquidity, faster settlement, and lower costs. Digital tokens may also be divisible so as to allow the potential market for trading the assets to be expanded.

The technology for tokenizing a tradeable asset, i.e., creating a digital token that represents the tradeable asset, has been developed, and a distributed ledger technology, such as blockchain, may be employed for recording transactions involving the digital token. The use of digital tokens with distributed ledger technology has exploded in recent years, such that there are now a large number of trading platforms, each having different operating models. For an entity to participate in the market for any of these digital tokens, the entity's legacy financial system has to be integrated with each of these different types of trading platforms. The integration process can be labor-intensive and error-prone and has been a limiting factor in a wider participation in the market for digital tokens.

SUMMARY

One or more embodiments provide a digital token that has a programmable field in which token type is specified, and a method of creating, routing, and performing operations on the digital token according to its token type. By allowing the token type to be programmed into the digital token, a single platform may be rolled out to handle transactions involving digital tokens of many different types and facilitate a wider participation in the market for digital tokens.

A method of creating, routing, and performing operations on digital tokens according to one embodiment is carried out in a network having a plurality of nodes, wherein each node of the network has code executed therein to enforce rules associated with different types of the digital tokens. The method includes the steps of: creating a digital token having a programmable field from asset data and specifying a token type of the digital token in the programmable field of the digital token; routing the digital token having the specified token type through the nodes of the network to a destination node according to the rules associated with the specified token type; and when the digital token arrives at the destination node, performing an operation on the digital token and updating a record maintained at the destination node according to the operation performed.

In another embodiment, a computer network having a plurality of nodes is provided. Each node of the computer network has code executed therein to enforce rules associated with different types of digital tokens and to communicate with other nodes of the computer network to implement a distributed ledger. When a digital token arrives at a node of the computer network, the node examines the token type of the digital token, loads a policy contract corresponding to the token type, the policy contract including routing rules for the digital token, and routes the digital token to a destination node based on the routing rules.

BRIEF DESCRIPTION OF THE DRAWINGS

FIG. 3C depicts a data structure of a policy contract and a data structure of a token of a digital draft type, according to embodiments.

FIG. 3D depicts a master token structure and a sub-token structure, according to embodiments.

DETAILED DESCRIPTION

In the embodiments described herein, the digital token represents a payment obligation or a delivery obligation in a supply chain, where goods and services are delivered in exchange for promises to pay (payment obligation) or goods and services are promised to be delivered (delivery obligation) in exchange for payment. A simple example of a payment obligation is an invoice, and a digital token can be generated according to embodiments based on the invoice. In general, digital tokens are assets against which money can be borrowed from interested funders and when securitized, against which commercial paper or bonds may be issued to raise money from debt capital markets.

Figure 1:
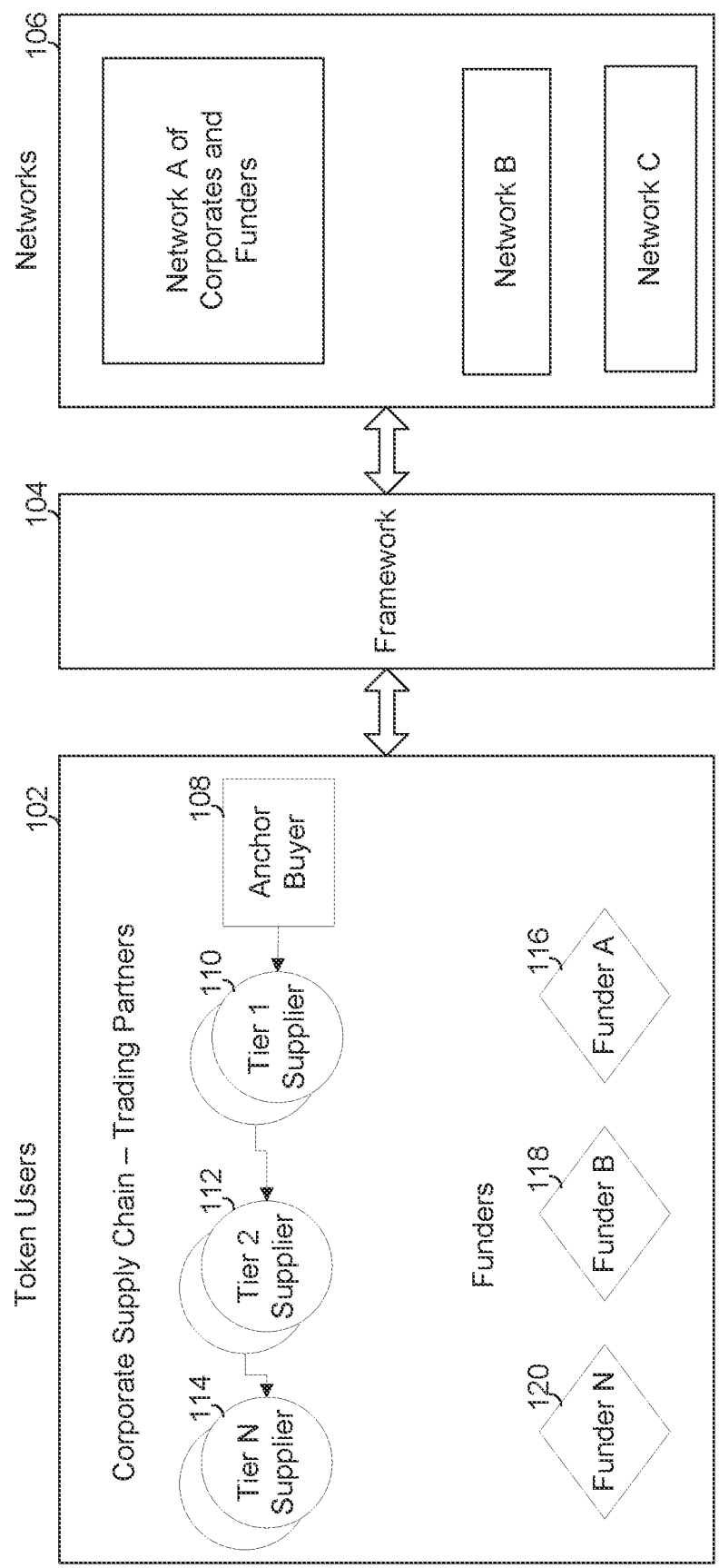
FIG. 1 depicts a top-level diagram of token users, a set of computer networks, and a framework that provides services to the token users and the computer networks, according to embodiments.

FIG. 1 depicts a top-level diagram of token users, a set of computer networks, and a framework that provides services to the token users and the computer networks, according to embodiments. As shown, token users 102 include an anchor buyer 108, tier 1 suppliers 110, tier 2 suppliers 112, and so forth up to tier N suppliers 114, and a set of funders including funder A 116, funder B 118, and so forth up to funder N 120. Each of networks 106 is a computer network that is configured with a plurality of nodes, and each node of the computer network includes one or more computing devices. In the embodiments illustrated herein, the computer network is a virtual computer network provisioned from physical devices and physical connections of a computer network. The computing devices at the nodes are virtual computing devices provisioned from physical servers in a cloud computing environment. Framework 104 represents a set of applications that provide services to token users 102 who are registered to networks 106 and to nodes of networks 106. The applications of framework 104 are hosted in physical servers in a cloud computing environment, or virtual servers provisioned from the physical servers in the cloud computing environment. Networks 106 are further described in reference to FIG. 3A. Framework 104 is further described in reference to FIG. 4.

Figure 2:
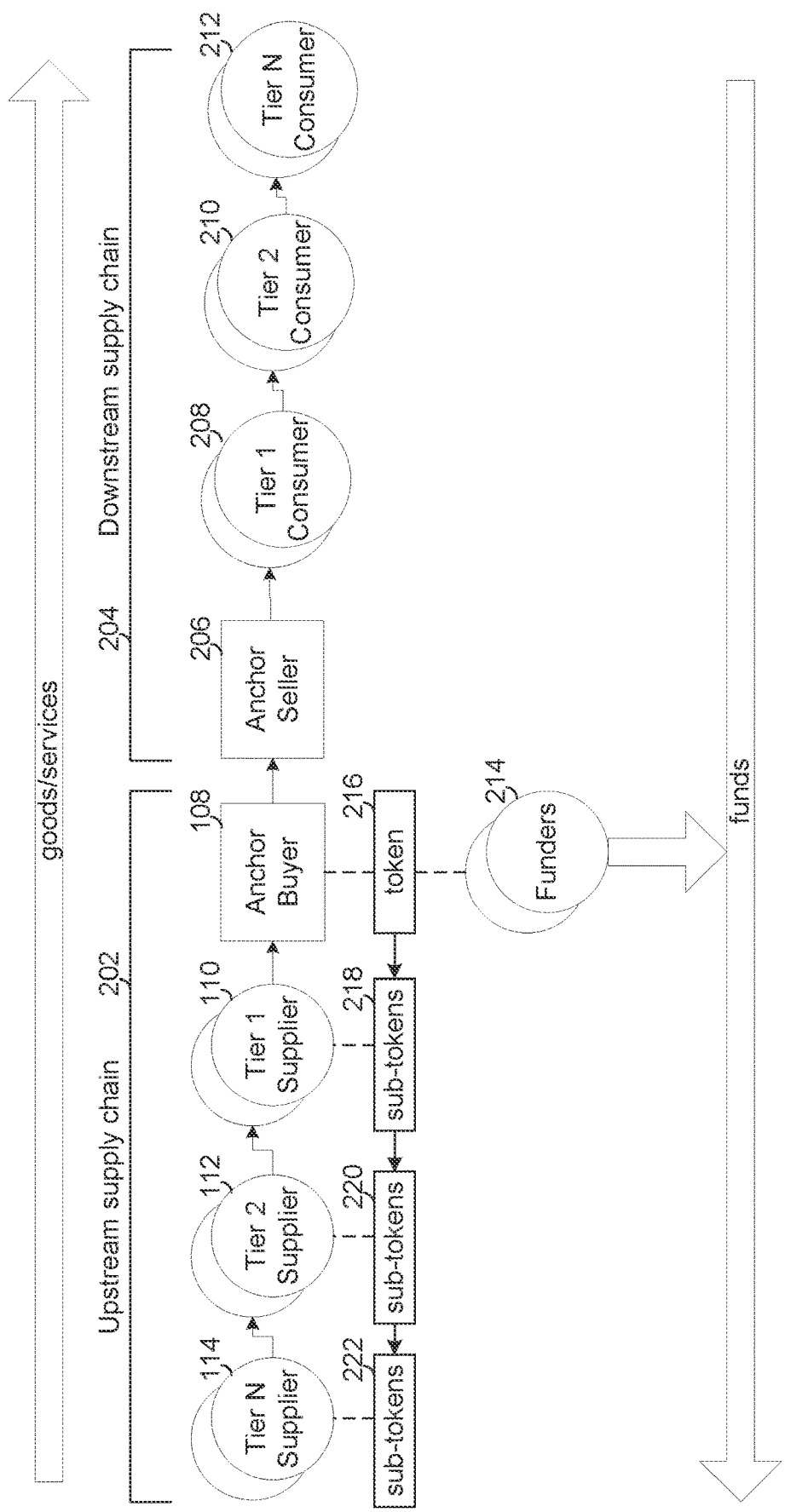
FIG. 2 depicts a conceptual relationship between the tiers of suppliers, anchor buyer, anchor seller, and funders.

FIG. 2 depicts a conceptual relationship between the tiers of suppliers, anchor buyer, anchor seller, and funders. In the figure, anchor buyer 108 provides a good or service which requires one or more tiers of suppliers in an upstream supply chain 202. Anchor buyer 108 sells the good or service to an anchor seller 206, which, in turn, sells the good or service to one or more tiers of consumers 208, 210, 212 in a downstream supply chain 204.

For example, anchor buyer 108 may be Ford Motor Company, and the good it provides may be a vehicle. Ford Motor Company relies on many tiers of suppliers 110, 112, 114 for the component parts and assemblies of the vehicle. Each tier supplier that provides a component part or assembly also provides an invoice to anchor buyer 108 for the cost of the component part or assembly. In this example, anchor seller 206 may be a Ford dealer or distributor that provides a large number of vehicles and resells them to one or more tiers of consumers 208, 210, 212, such as end-users or car rental companies.

FIG. 2 also illustrates funders 214 that provide funds to enable the supply chain 202 to operate. As shown, the funds flow in a direction opposite to that of the goods and services of the supply chain. Funders 214 may include anchor buyer 108, banks, or other non-bank financial institutions.

FIG. 2 further illustrates tokens 216 and sub-tokens 218, 220, 222 that are transferred to anchor buyer 108 and tiers of suppliers 110, 112, 114, respectively. Tokens 216 and sub-tokens 218, 220, 222 are examples of digital tokens (hereinafter also referred to as "tokens") that represent assets arising out of a trade transaction. The token allows for its liquidation upon a due date, for financing or early payment when the token represents a payment/delivery obligation for goods and services, and for partial (using sub-tokens) or whole transfer of ownership to the tiers of suppliers 110, 112, 114 (also called beneficiaries) in upstream supply chain 202. The tokens also enable different trade or trade finance platforms to connect finance demands with finance suppliers, e.g., funders 214. Finally, the token can enable checks against double-spending fraud and can be securitized by issuing commercial paper or bonds against them.

Figure 3A:
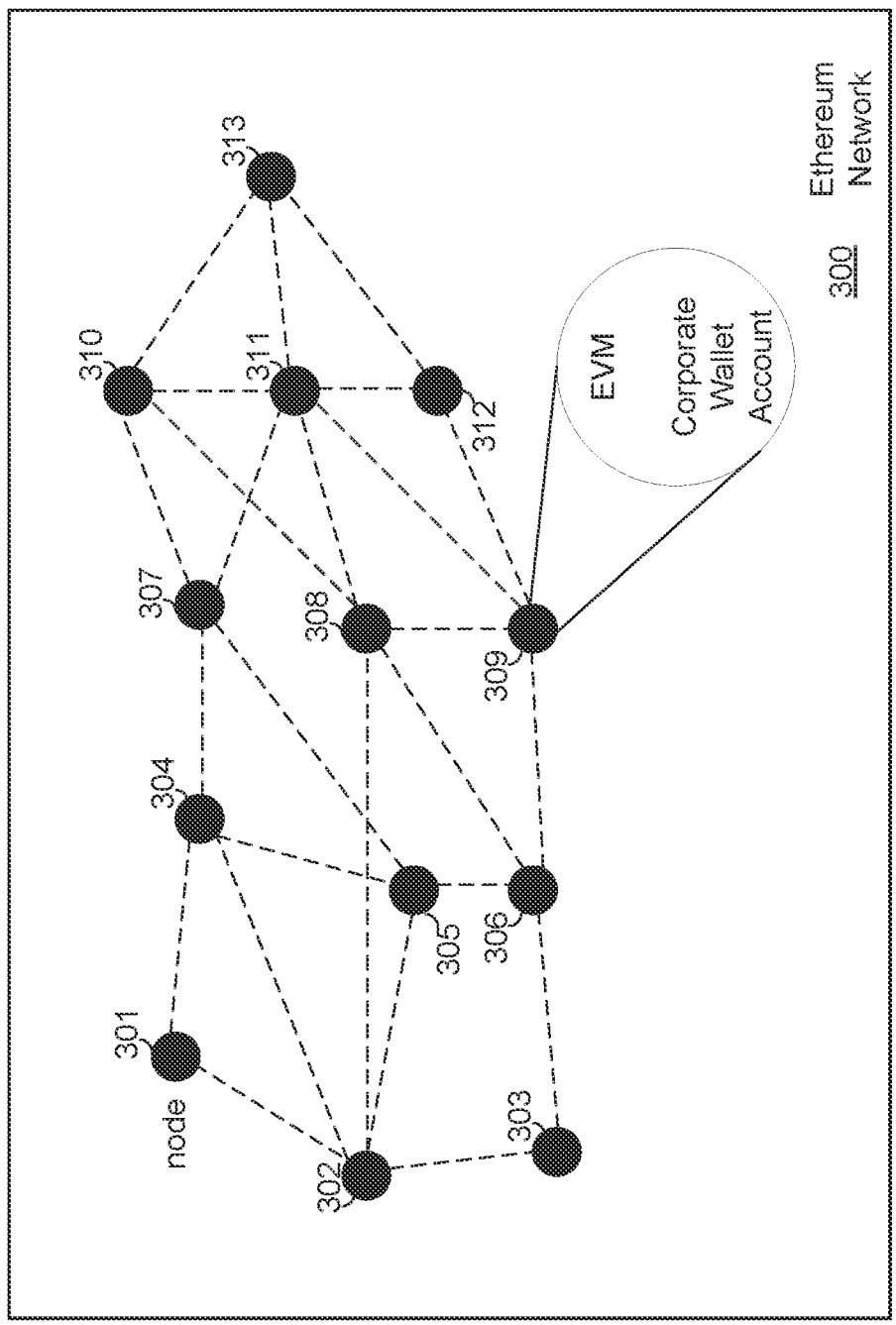
FIG. 3A depicts a representative network of the embodiments.

FIG. 3A depicts a representative network 300 of the embodiments. Network 300 is a virtual computer network having nodes 301-313 depicted. In one embodiment, network 300 is an Ethereum network, and each node thereof has an Ethereum virtual machine (EVM), as shown for node 309. In other embodiments, network 300 may be a Hyperledger network or an R3 Cordia Blockchain network.

Figure 3B:
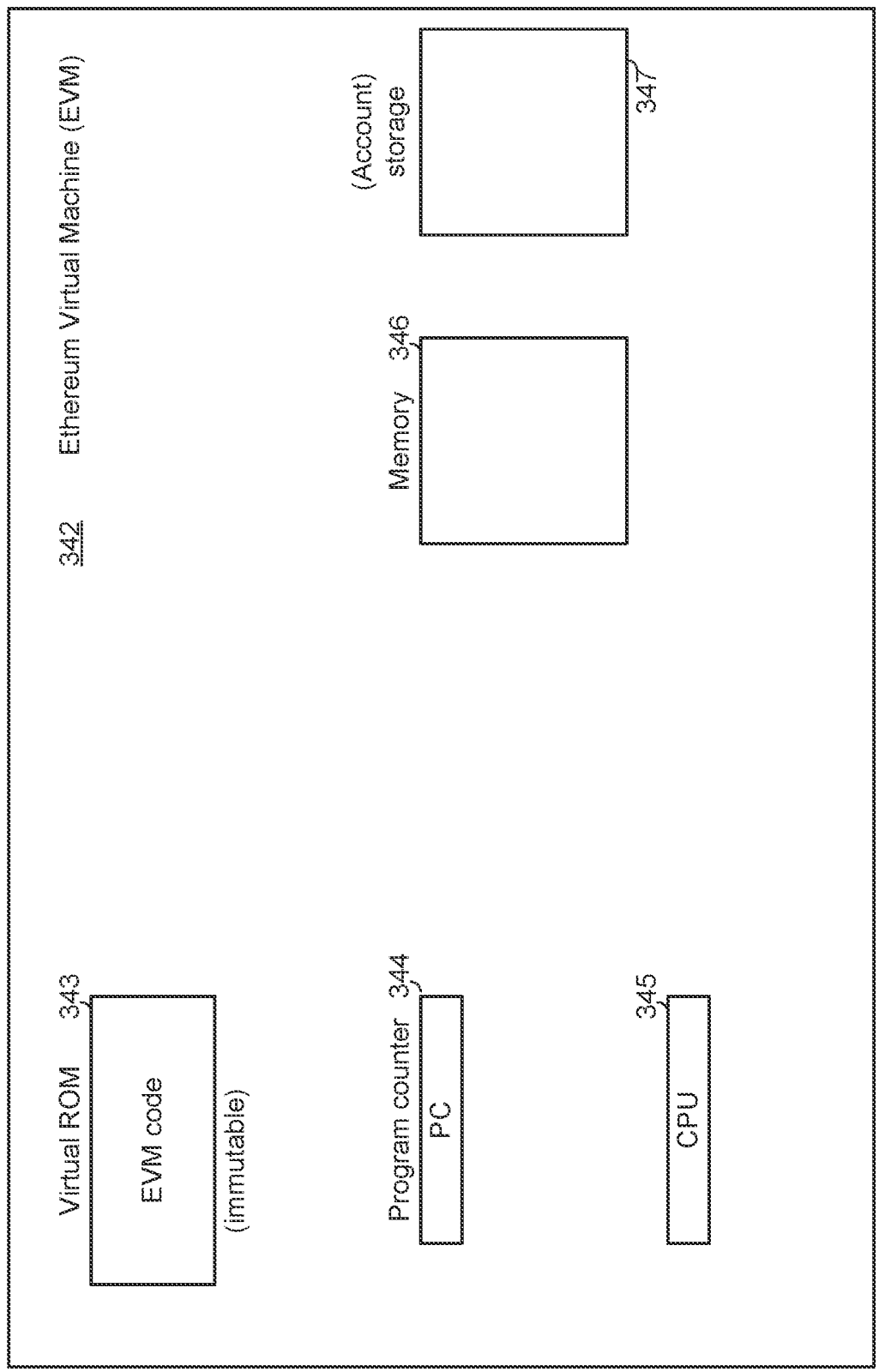
FIG. 3B depicts an Ethereum virtual machine.

FIG. 3B depicts an Ethereum virtual machine 342. EVM 342 includes a virtual ROM 343 in which EVM code is stored, a CPU 345, a program counter 344, a memory 346, and account storage 347. Memory 346 is a volatile memory with byte addressing. EVM 342 executes compiled bytecode stored in memory 346 and pointed to by program counter 344. Account storage 347 is a persistent memory that persistently stores information about tokens and transactions involving the tokens as further described below. EVM 342 can send a message to an EVM of a different node via a message call, thereby providing communication among the nodes in the computer network. EVM 342 can also input external data from a message call, output a log, and return values to a caller EVM.

According to embodiments, a token system is implemented in network 300 by programming logic in an Ethereum contract, which is referred to more generally as a smart contract. Multiple smart contracts, each associated with a different token type, may be implemented in the token system according to embodiments, and they are distinguished from one another based on their token type. EVM bytecode is created in each EVM 342 by compiling the smart contracts. These smart contracts are developed using various source code languages, such as Solidity, Viper, or LLL (Lisp-like Language). Solidity is specifically designed for smart contracts executed in the EVM. Viper is a Python-like language for building secure smart contracts. LLL is a low-level adapted to generate smaller bytecodes for smart contracts than the other languages. CPU 345 may be an x86 processor, an ARM processor, or other similar processor. Application binary interfaces (ABI) are available for EVM 342, such as the Solidity ABI. Application programming interfaces (API) are also available for EVM 342, such as the Web3 API.

FIG. 3C depicts a data structure of a smart contract (hereinafter also referred to as a "policy contract"), a data structure of a master token, and a data structure of a token of a digital draft type, according to embodiments. Policy contract 372 is a collection of rules or criteria that a policy owner creates to manage the lifecycle of a token. The lifecycle of the token includes business validations, token routing rules, risk assessment, security, and compliance requirements. Owners of the token policy contract can be network sponsors, finance marketplace owners, anchor corporates, finance program owners, or trade finance application vendors.

As shown in FIG. 3C, the data structure of policy contract 372 includes fields for storing token type information 376, brand information 377, token security criteria 378, asset batching-sub-batching criteria 379, finance program criteria 380, dynamic risk assessment providers 381, network market room routing criteria 382, maturity event processing criteria 383, and sub-token type information 384.

Token type information 376 is logical information that is used to distinguish token types. For example, a token can be a bank approved payable draft (APD) or a corporate APD. When new token instances are created for a given policy contract, this attribute value is used as the token type.

Brand information 377 includes the visual aspects of the token that represent the owner of the token policy contract in the marketplace. These visual aspects include logos, images, mottos, description, and other brand conveying elements.

Token security criteria 378 are a set of security and compliance-related rules required to operate on the token.

Asset batching sub-batching criteria 379 are rules that describe how the grouping of trade assets is to occur when there are large volumes of trade assets. Batching can occur based on maturity dates, parties, account numbers, and the like.

Finance program criteria 380 are the rules for setting the eligibility for selecting the assets for finance. For a given type and criteria of assets, these rules determine what finance is offered at the rates and limits of that finance.

Dynamic risk assessment providers 381, as an owner, make a risk assessment and score the tokens accordingly. The network may have multiple risk assessment providers registered, each having its own algorithm. For a policy contract, one or more of these scoring providers are enabled.

Network market room routing criteria 382 includes routing rules for routing a token to a market room of a funder and the other market rooms if and when a funder rejects funding of the token.

Maturity event processing criteria 383 includes all events that need to be scheduled upon the maturity of a token, such as reminders before a maturity date and payment events on the maturity date. The party who owns the payment obligation, the funders, and the beneficiaries are notified based on these criteria.

Sub-token type information 384 sets out the criteria for creating and maintaining sub-token types. These criteria include policies, such as the particular sub-token type that is allowed to be created for a token, the particular sub-tokens that support divisibility, whether the sub-token may be treated as a negotiable instrument, and transferred to other beneficiaries.

All of these criteria become rules by which the lifecycle of the token is enforced. Each set of criteria is similar to a clause in a contract that has a number of rules. Within criteria, more rules can be added as needed for a policy.

The token itself has two main parts, a single master token, and one or more sub-tokens. As depicted in FIG. 3C, master token 375 contains programmable fields 393-397 for unique identification information about the token, a reference to the parties pertaining to the token, such as buyer, seller, and funder, a reference to a policy contract governing the token, a token type, and a token brand. A token can be routed internally to multiple market rooms for a single network or externally to other networks.

A sub-token represents the transaction activities of a corresponding master token. Each sub-token can represent a different type of transaction. For example, sub-token types can include payment-due obligations, digital drafts, securitization, or syndication, where a sub-token type indicates a particular configuration of Token Policy Contract for a given business context. Sub-token types include Approved Payable Drafts (APDs), Future Forward Contracts (FFCs), and Trade Receivables Securitizations (TRSs). A funder, e.g., Citibank, can further introduce customizations or extensions to the APD Token Policy Contract, and a new sub-token type can be created, e.g., Citi-APD. Sub-tokens can be further divided and transferred like a negotiable instrument.

Still referring to FIG. 3C, a digital draft type token 374 that represents a payment obligation is shown as an example of a sub-token. The data structure of digital draft type token 374 includes programmable fields 385-392 for storing the following information: reference to the master token from which the sub-token originated; a token type; a maturity date, a draft amount; buyer's bank, drawer, and payee; payee discount; whether the token is splittable or mergeable; and whether the drawee can make a payment on a drawer account.

Nodes 301-313 in the network of FIG. 3A are responsible for routing tokens among the nodes in the network based on the type of token received by a node. Routing depends on the network market room routing criteria in the policy contract associated with the type of token received by the node.

FIG. 3D depicts a master token structure 350 and a sub-token structure 352 as stored in the account storage of an EVM, according to embodiments.

Master token structure 350 includes attributes 353-362 for: transaction party information, which identifies a buyer, a supplier, and a funder if involved; reference to an asset, which includes the hash value of the asset information and an ID of data (e.g., invoice data) of the asset that backs the token, which is stored in an asset storage area for the system; currency of the transaction; amount of the token; date of the token; token type; ID of the client application from which the token originated; ID of the network on which the token is allowed; the token owner ID; and ID of the market room in which financing relating to the token occurs.

Sub-token structure 352 includes attributes 363-371 for: sub-token type; sub-token ID; master token ID, which is a reference back to the master token from which the sub-token originated; sub-token owner ID (e.g., the beneficiary owner account ID); sub-token beneficiary wallet address 367 (e.g., address of the wallet that is maintained in an EVM storage account); sub-token currency; sub-token amount; sub-token's date of issuance; and sub-token maturity date.

In most cases, the token type of the sub-token matches the token type of the master token from which the sub-token originated. For example, in the case of an APD, the sub-token type 363 is also APD. However, in some cases, sub-tokens originating from the same master token can have multiple sub-token types.

Figure 3E:
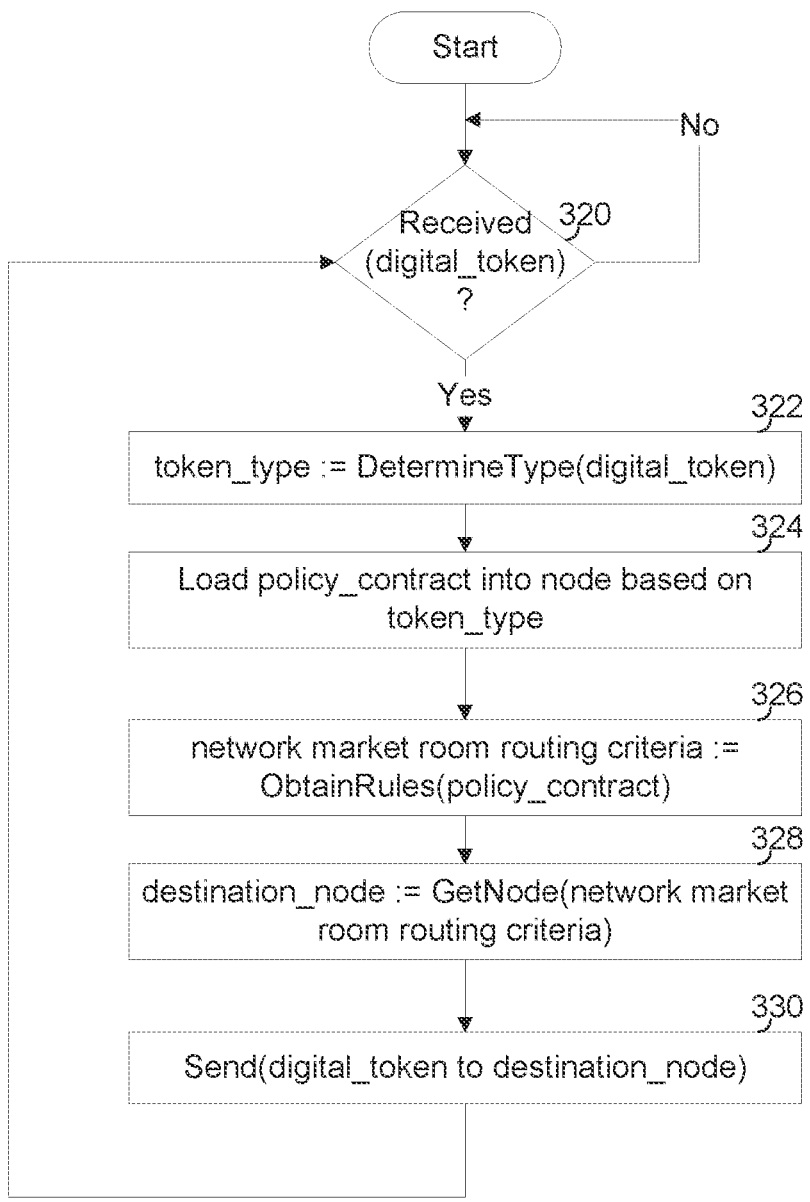
FIG. 3E depicts a flow of operations by a node for routing digital tokens in the network, according to embodiments.

FIG. 3E depicts a flow of operations by a node for routing tokens in the network, according to embodiments. In step 320, if and when a node in the network receives a token, then, in step 322, the node determines the type of token from the token type field in the token. In step 324, the node loads code for a policy contract associated with the determined token type. In step 326, the node obtains network market room routing criteria from the policy contract. The network market room routing criteria contain rules for routing the tokens. In step 328, the node determines a destination node from rules in the network market room routing criteria, and in step 330, the node sends the token to the destination node.

Routing of a token and other interactions between nodes in the network may constitute a transaction, which is a change in the world state of the nodes. When the network is a blockchain network, the transactions are collected into blocks, and each node in the network has the same view of a chain of blocks and thus transactions that have been committed in the chain. Having the same view of the blockchain means that each node has the same account storage 347, because accounts in account storage constitute the world state. Therefore, when an update to a record in account storage 347 occurs, the other nodes of the network eventually have the same record of the update in their account storage information. Thus, if a node representing a token user accepts a token for financing or splits a token into sub-tokens, the account state in account storage in all nodes is updated to reflect these changes.

Figure 4:
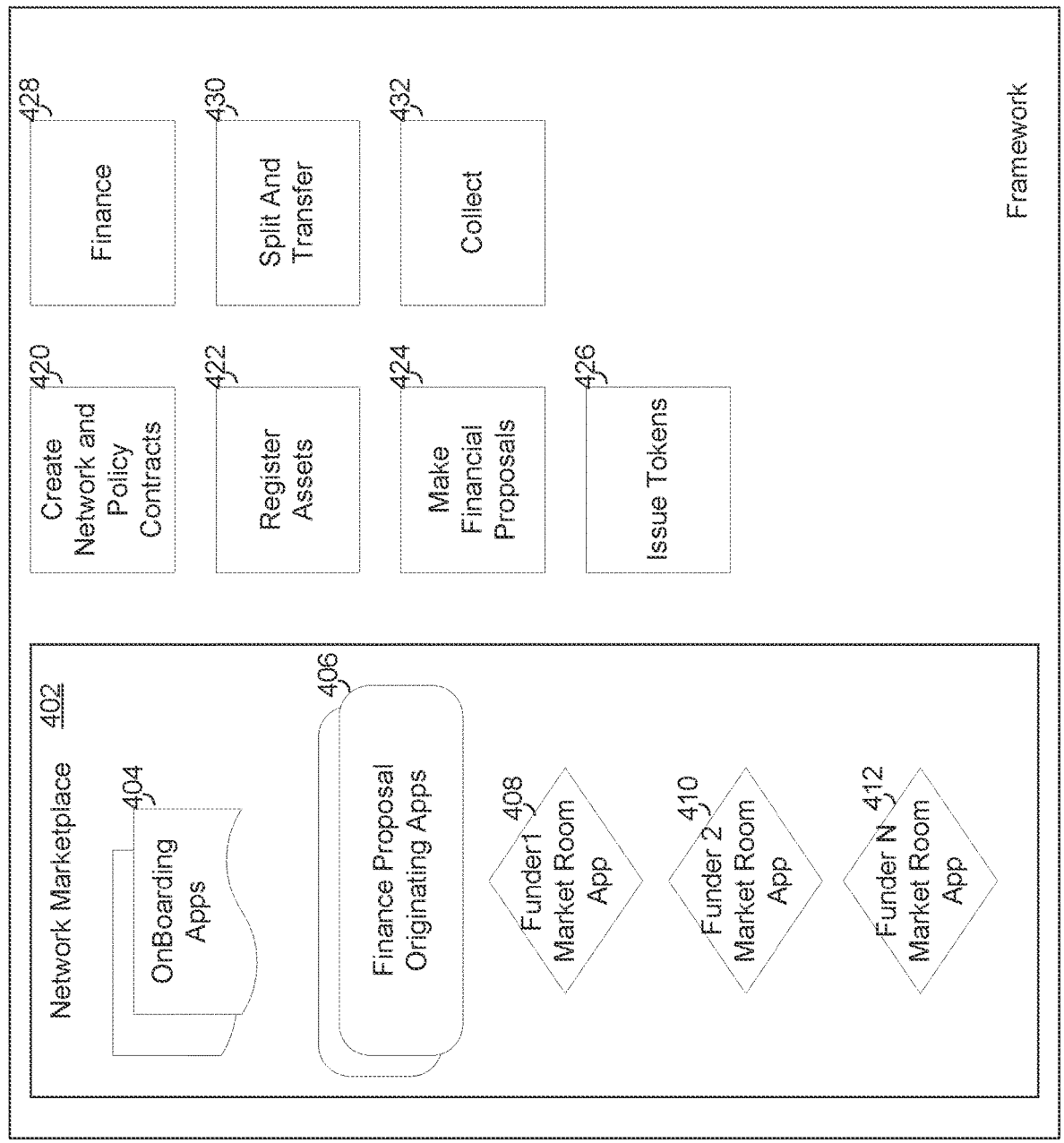
FIG. 4 depicts a framework according to embodiments.

FIG. 4 depicts framework 104 according to embodiments. Framework 104 includes a set of applications for provisioning network marketplace 402 and for providing a number of services that support token users 102 and a network to which they are registered. The support services of framework 104 allow management of policy contracts and the token lifecycle process, which is enforced by the policy contract.

Network marketplace 402 is a virtual marketplace where entities with finance demands meet with finance suppliers. Network marketplace 402 includes client applications, which act as clients to the support services of framework 104. The client applications provide various services to token users 102, including onboarding (OnBoarding Applications 404, which register token users 102 to the network) and transaction management, as well as trade finance (Financial Proposal Originating Applications 406) and finance marketplace applications (Funder Market Room Applications 408, 410, 412). Nodes in the network may include code portions of these client applications. Each funder has a different market room, which has an address in the network that is reachable through one of the nodes of the network, and market room application by which the funder configures a finance program and initiates finance processing. Financing is carried out and controlled by means of policy contracts described above.

As mentioned above, FIG. 4 also depicts a number of support services of framework 104. The support services include creating a network 420, registering assets 422, making financial proposals 424, issuing tokens 426, financing 428, splitting and transferring tokens 430, and collecting payments 432. Each of these services is further described below. In certain embodiments, network marketplace 402 includes an asset storage area for storing registered assets.

Figure 5:
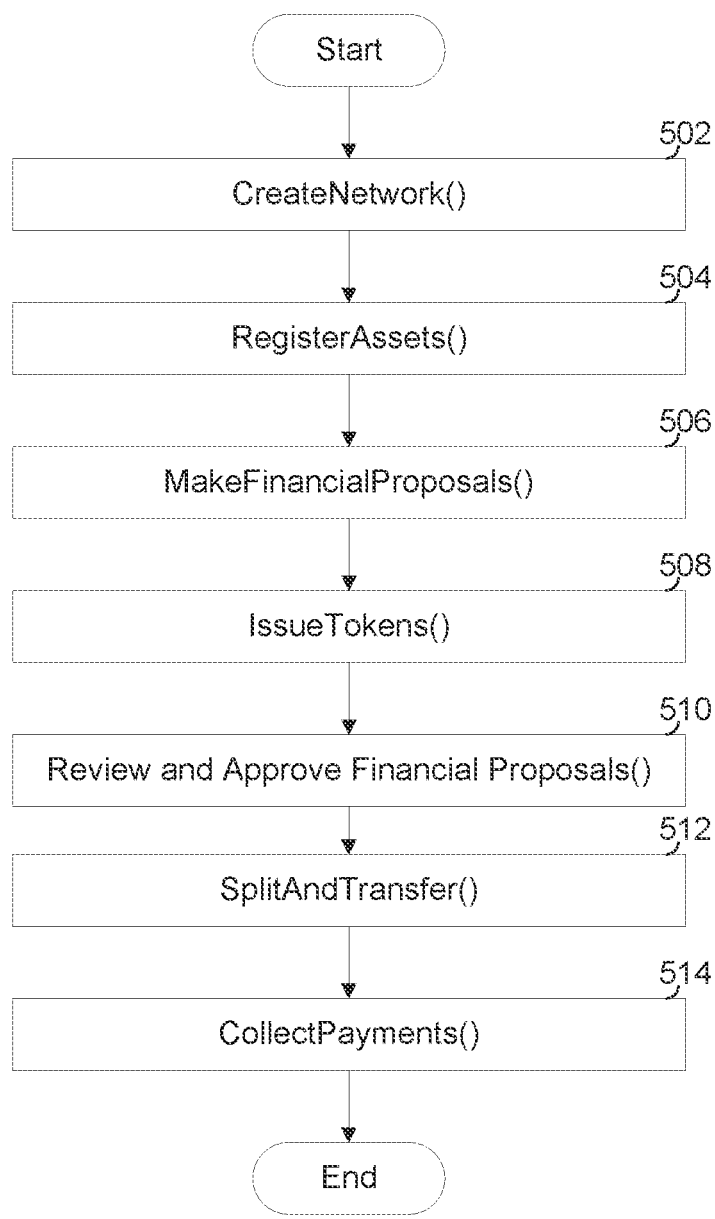
FIG. 5 depicts a flow of operations among the services provided by the framework, according to embodiments.

FIG. 5 depicts a flow of operations among the support services provided by framework 104, according to embodiments. The support services include creating a network of suppliers and funders in step 502, registering assets involved in the trading in the supply chain in step 504, making financial proposals regarding the assets in step 506, issuing tokens based on the assets in step 508, reviewing and approving the financial proposals in step 510, splitting and transferring tokens among the network of suppliers in step 512, and collecting payments on tokens in step 514.

Creating a network of suppliers and funders in step 502 includes setting up nodes of the network (e.g., network 300), getting trading partners and funders on board (registered to the network), registering finance programs to be accessible in the network, and creating policy contracts and loading the policy contracts in each node of the network. This step is performed during the design phase. Registering assets, making financial proposals regarding the assets, issuing tokens based on the assets, splitting and transferring tokens among the tiers of suppliers, and collecting payments on tokens in steps 504, 506, 508, 510, 512, and 514, respectively, are performed during a transaction phase.

In the embodiments described herein, the network that is created during the design phase is the Ethereum network, and the steps performed during the transaction phase are performed by executing one or more applications of framework 104 partly as applications in the cloud, such as by Amazon Web Services, and partly as bytecodes in an Ethereum virtual machine (EVM) in one or more nodes of the Ethereum network.

Figure 6:
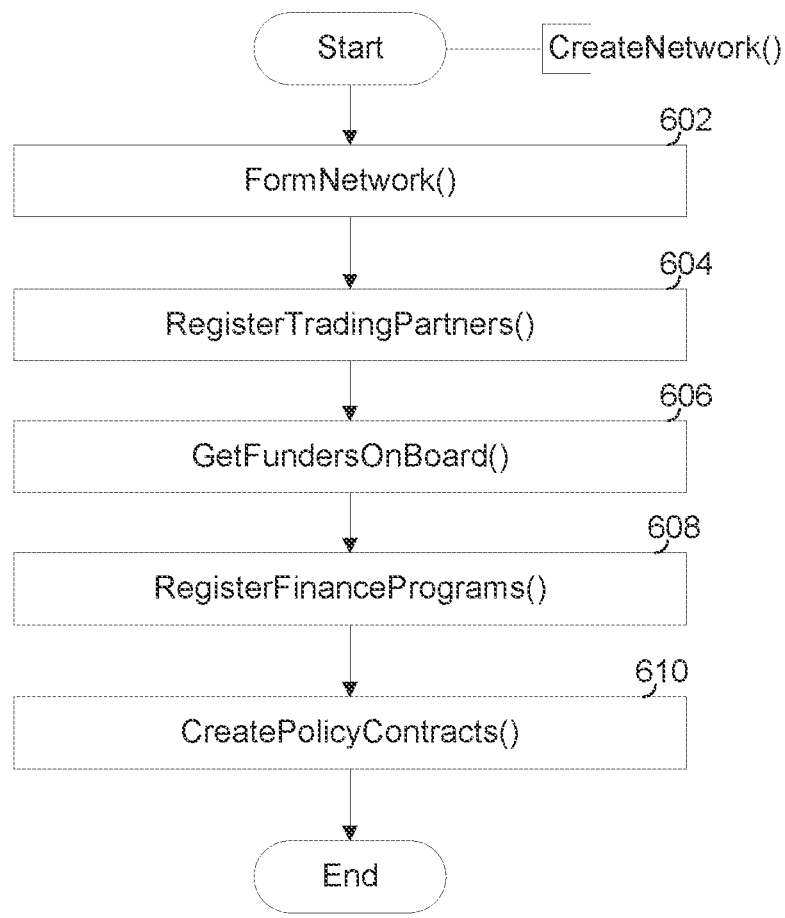
FIG. 6 depicts a flow of operations for creating a network according to an embodiment.

FIG. 6 depicts a flow of operations for creating a network according to an embodiment. The flow of operations includes forming the network itself in step 602, getting the trading partners on board in step 604, and registering trading partners in step 604, where the trading partners include buyers, suppliers, and distributors. The flow further includes getting the funders on board in step 606, where the funders include banks, non-bank financial institutions, and private institutional investors. Getting an entity on board (i.e., onboarding) is the process of registering various parties onto a network so that they have access to the network (e.g., through framework 104), and the computing devices by which they are accessing the network are given addresses within the network. This process can be simple in some cases or can include several compliance steps in other cases. For example, in the case of dynamic discounting, where there is no loan or funder involved, and the anchor buyer makes an early payment with a discount, the anchor buyer can provide the list of suppliers to whom an invitation is sent to self-register in a portal that has access to the network. In other cases like approved payables finance (APF), where funders are involved and depending upon country-specific legal requirements, compliance checks like KYB (Know Your Business) knowledge base consulting, KYC (Know Your Customer) identity checking for the directors of the business, running AML (Anti-money Laundering) software and other sanction checks are included as part of getting an entity on board. The flow further includes registering in step 608 finance programs according to which a funder offers one or more financing arrangements, also referred to as finance programs, which specify the criteria and terms for finance, including trading partner lists, currencies, amount limits, tenor (the term or maturity of the finance offer), and discount rates. In one embodiment, discount rates depend on the tier-level supplier who requests payment before the payment is due on the token or sub-token. At the tier 1 level, the discount rate is 5%, while at the tier 2-3 level, the discount rate is 7%, and above the tier 3 level, the discount rate is 9%. Higher discounts are set for higher tier levels because a higher tier supplier is smaller in size and usually less known than a lower-tier level supplier and thus pose a greater risk. The flow of FIG. 6 further includes creating the policy contracts in step 610, as described above.

Figure 7:
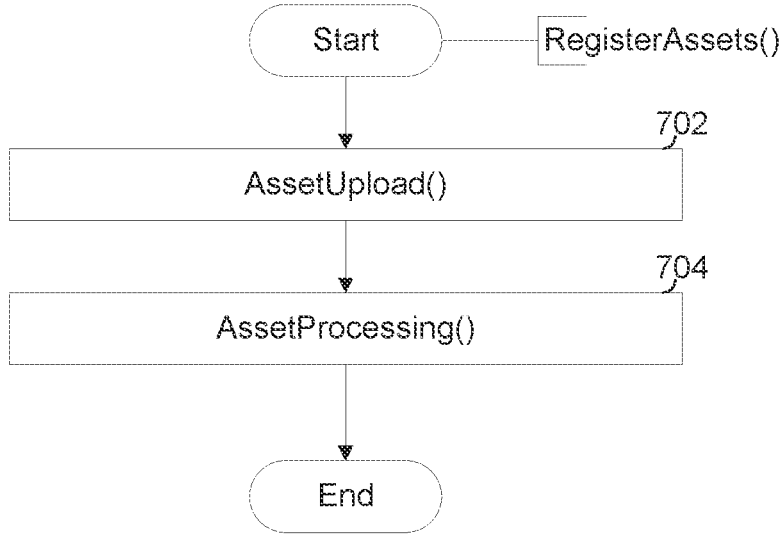
FIG. 7 depicts a flow of operations for registering assets according to an embodiment.

FIG. 7 depicts a flow of operations for registering assets according to an embodiment. In step 702, assets are registered with framework 104. This includes registering the type of assets, each of which is a digital representation of the obligation arising out of a trade transaction and the format of the asset. Formats such as CSV or XLS files, XML, APIS, Web Services, or unstructured formats like PDFs and images are allowed. In step 704, based on business needs defined in the policy contract, batches of assets are registered or may be re-batched or grouped based on various criteria like the parties involved, due data, and accounts. This results in new asset batches, sub-batches, or groups being created to aid in processing.

Figure 8:
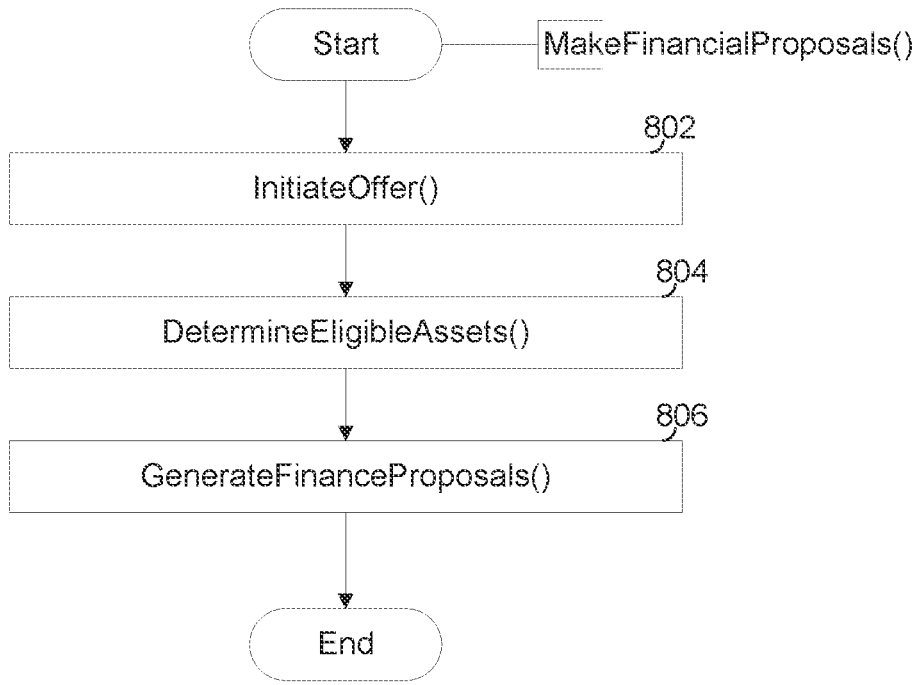
FIG. 8 depicts a flow of operations for making financial proposals according to an embodiment.

FIG. 8 depicts a flow of operations for making financial proposals according to an embodiment. The flow includes trading partners or funders initiating an offer in step 802 based on working capital needs and the finance programs offered. Such offers may be manual or automated. The flow further includes determining in step 804 eligible assets for a specific demand for finance based on the asset eligibility criteria defined in policy contract 372. The flow further includes generating a finance proposal in step 806 that may include details such as discount rates and fees, after which the proposal is submitted to the requesting party for approval.

Figure 9:
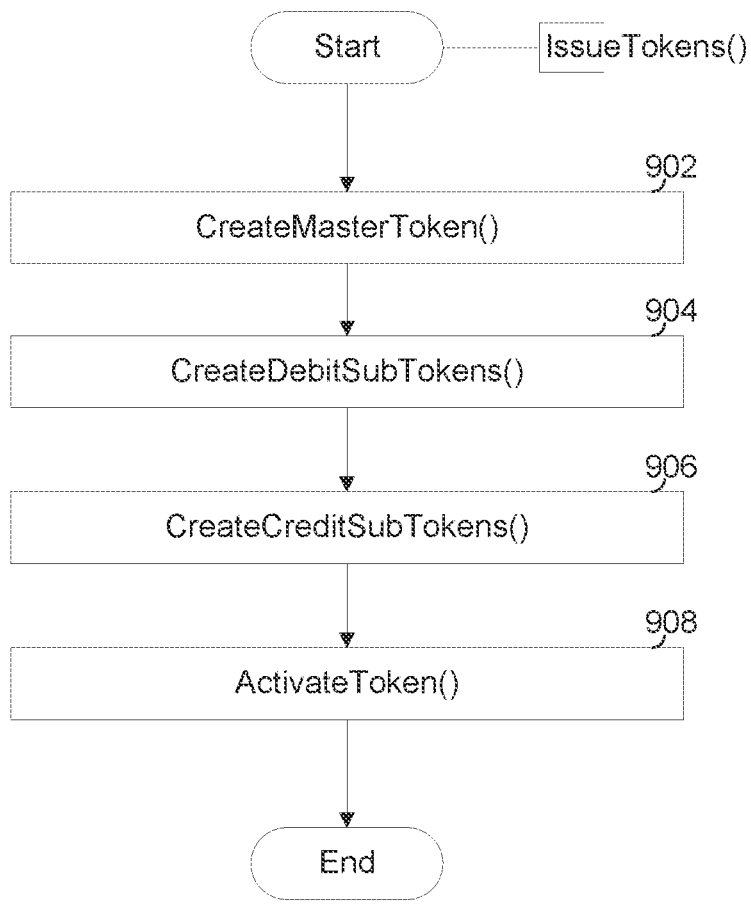
FIG. 9 depicts a flow of operations for issuing tokens according to an embodiment.

FIG. 9 depicts a flow of operations for issuing tokens according to an embodiment. The flow includes creating in step 902 a master token, which includes the token identification, a reference to the parties, a reference to the policy contract, the token type, and the token brand, as depicted in FIG. 3C. The flow further includes creating in step 904 sub-tokens for the debit side. The debit side sub-tokens represent payment obligations in eligible assets that are due. One sub-token for each unique due date in the eligible assets is created. For example, in the case of an invoice, a sub-token is created for the buyer's or payer's payment obligation. The flow further includes creating in step 906 sub-tokens for the credit side. One example of the credit side sub-token is digital draft type token 374 described above.

The flow further includes activating the token in step 908, which is performed by routing the token to a funder in the market room as per the finance proposal generated in step 806, as described above.

Figure 10:
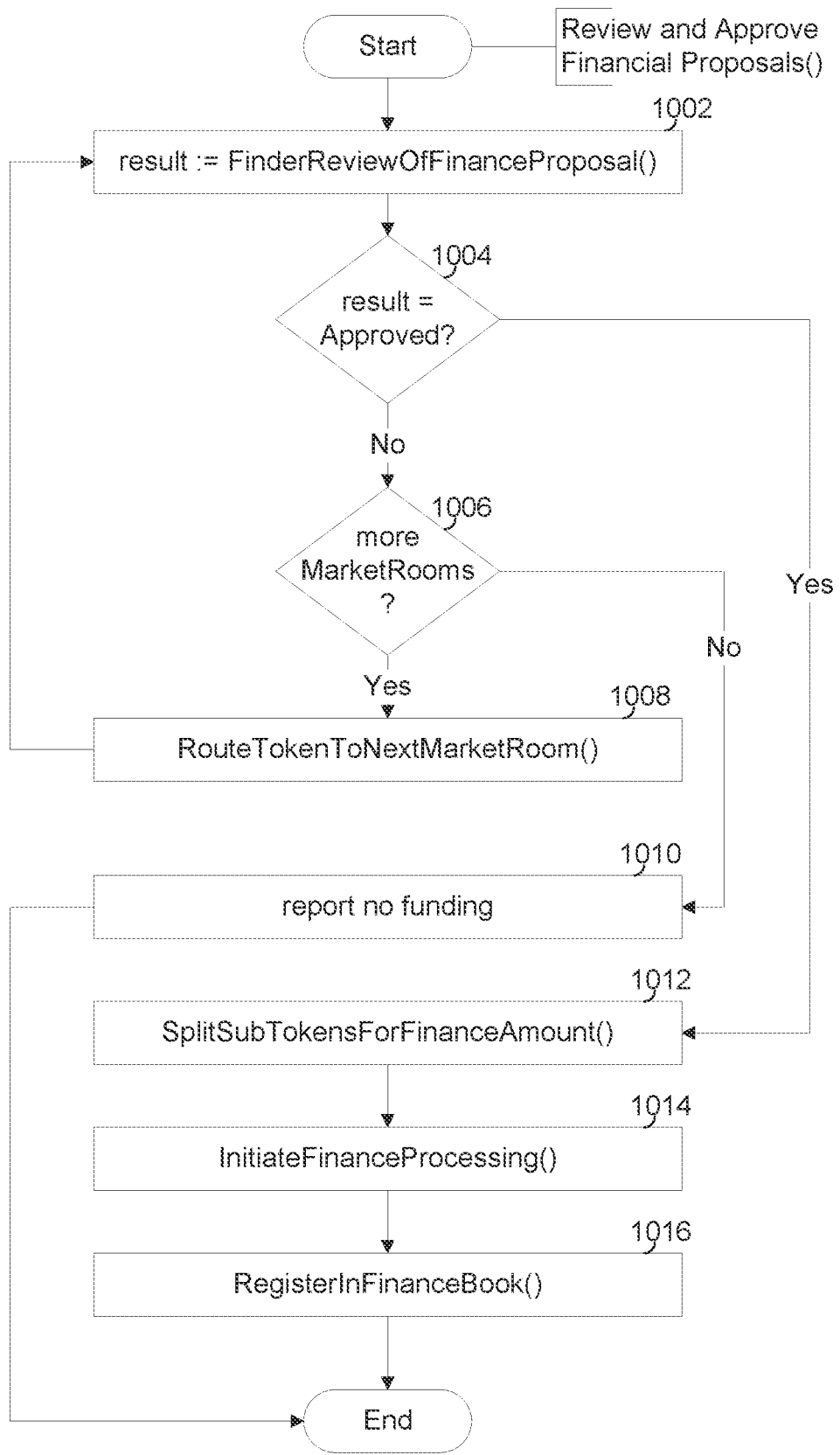
FIG. 10 depicts a flow of operations for reviewing financing proposals according to an embodiment.

FIG. 10 depicts a flow of operations for reviewing financing proposals according to an embodiment. In the flow, the funder reviews in step 1002 the finance proposal according to the criteria for risk assessment in the finance program. The flow further includes the funder either approving or rejecting the finance proposal in step 1004 based on the result of the funder's review. If the proposal is approved, as determined in step 1004, the sub-tokens are split for the finance amount in step 1012. For example, if the finance amount is only a partial amount of the sub-token, the sub-token is split into a new sub-token, which represents the finance amount with the funder as a new beneficiary and the others representing the outstanding amount against the payee. After splitting the sub-token, the flow further includes initiating in step 1014 a finance processing event for each sub-token with the market room application for the respective funder. The flow further includes registering in step 1016 in a finance book the exact set of assets in order to prevent double spending. In one embodiment, the finance book is maintained in the account storage in the EVM.

If the funder does not approve the proposal, as determined in step 1004, then the token is routed to another market room in step 1008 according to the policy contract if there are other suitable market rooms as determined in step 1006, or in some cases, the token is routed externally to other networks. If no other suitable market rooms are available as determined in step 1006, then the flow reports that no funding is possible in step 1010.

Figure 11:
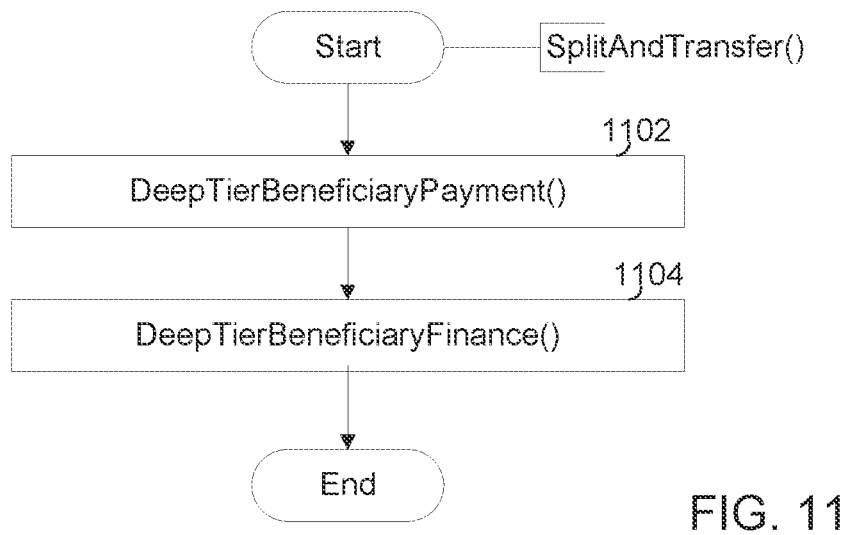
FIG. 11 depicts a flow of operations for splitting and transferring of a token according to an embodiment.

FIG. 11 depicts a flow of operations for splitting and transferring of a token according to an embodiment. The flow includes first having a tier 1 beneficiary (payee) make payments in step 1102 by splitting the draft sub-token as necessary and transferring the sub-token ownership to their one or more trading partners who are tier 2 suppliers (aka, beneficiaries or payees). Making payments to other trading partners may be repeated by each tier to the next tier of suppliers. The flow further includes making finance offers of each draft token from the payee or funders in step 1104. Step 1104 further includes initiating finance, which is similar to initiating finance processing in FIG. 10 that occurs in step 1014 and step 1016 by routing the token.

Figure 12:
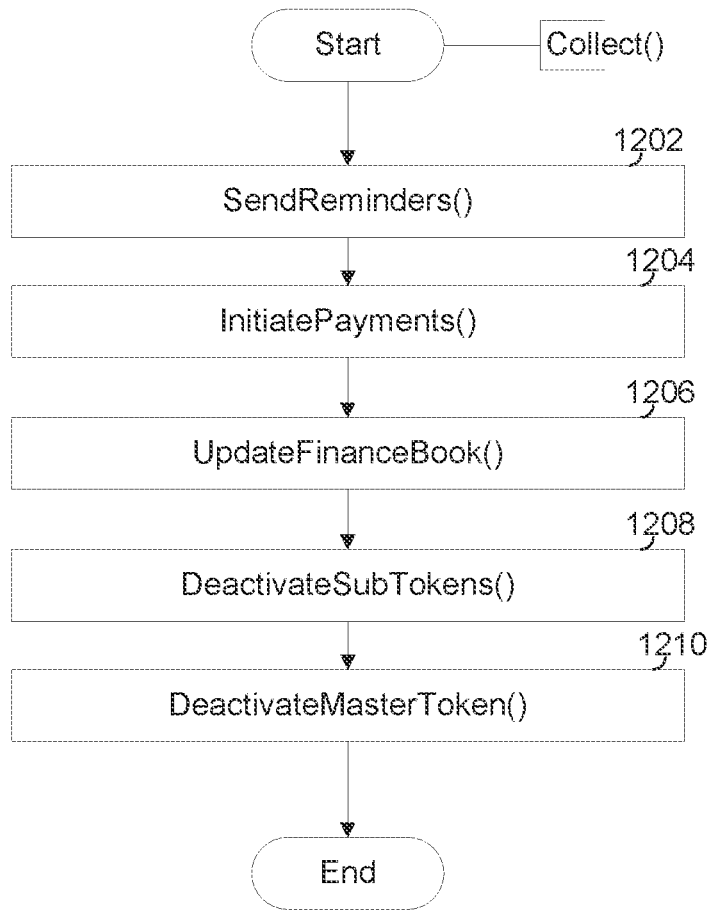
FIG. 12 depicts a flow of operations for collecting payments according to an embodiment.

FIG. 12 depicts a flow of operations for collecting payments according to an embodiment. The flow includes sending in step 1202 event notifications as reminders some number of days before the sub-token maturity date as defined in the policy contract. The flow further includes initiating payments in step 1204 by sending events to client apps to debit payers and credit payees or funders as might be needed based on the funders or payees in the beneficiary chain. The flow further includes updating in step 1206 the finance book to reflect the closure or settlement of the financing. The flow further includes deactivating sub-tokens based on the maturity dates in step 1208; events thereof are sent to the client applications. The flow further includes deactivating the token in step 1210 when all sub-tokens representing payees are deactivated.

The above-described flows of framework 104 support various business flows such as approved payable financing, pre-shipment financing, future forward contracts for commodity exchange, trade receivables securitization, and international shipment-transloading.

In approved payable financing, the supply chain finance characteristic is payables finance and deep tier finance. The network onboarding includes onboarding anchor buyers, suppliers, funders, and deep tier suppliers. The policy contract is a receivable purchase agreement (RPA). The assets that are registered are approved payables. The token type that is issued is an approved payable draft (APD). The digital payable draft can be split and transferred among the suppliers. The financing offers and requests in the marketplace application include the APD holder requesting discounting of the APD. Collecting payment is based on the buyer's payment obligation being due. At maturity, the funders are paid first, and then the drafts of the suppliers are settled.

In pre-shipment financing, the network onboarding includes onboarding suppliers, the buyer, a broker, and a finance provider. The policy contract is a future or forward contract. The assets to be registered are commodities. The token type is an FFC, and the asset has quality criteria. In the split and transfer step, the broker can transfer the FFC to ultimate suppliers (for example, farmers who grow and supply produce), where the broker is the tier 1 supplier who provides services to farmers, including logistic and financial services. The ultimate supplier can request finance separately. The commodity is delivered according to the quality criteria. Funders are settled first, and the future or forward contract is settled on the due date for the accepted commodity.

In trade receivables securitization (TRS), the supply chain finance characteristic is securitization. The network onboarding includes onboarding an originator, obligors, special purpose vehicles (SPV), investors, an arranger, a servicer, and a trustee. The policy contract is an assignment agreement, a servicing agreement, a trust deed, an accounts agreement, and a payment undertaking. The assets are trade receivables. The token type is a TRS. Debt securities are issued and purchased by investors. The asset pool that includes trade receivables is created, and suppliers and their buyers are identified. Issued securities can be split into tranches that are subordinated to each other. Each tranche has a different interest rate and risk exposure. Financing offers and requests in the marketplace include the SPV company issuing debt securities through private offerings to investors. Collecting payment includes purchasing new trade receivables (with discount) into the asset pool, where an asset pool is a logical set of assets representing trade obligations, such as invoices, with each obligation having a different due date and risk profile. For example, an asset pool may include 1000 invoices with a total amount of $1 million, each having various due dates spread across a six-month period. As each obligation becomes due or delinquent, it is removed from the pool, and new ones are added to maintain the total value of the pool at $1 million. Collecting payment further includes reevaluating the asset pool for paid and delinquent invoices, transferring reconciled buyer payments to the collection and payout account, monitoring supplier's escrow account, receiving and reconciling a buyer's payment, and distributing fixed income to investors. The debt securities are settled on the debt securities due dates.

In international shipment-transloading, the supply chain finance characteristic is in-transit freight finance. The network onboarding includes a shipper, a buyer, a consignee, a freight forwarder, carriers, port authorities, and a finance provider. The policy contract is a shipment or bill of lading. The assets are goods. The token type is a shipment, which represents a digital version of a master bill of lading and can include other documents such as a commercial invoice, transportation, certificate of origin or quality, and insurance. A token can be split into sub-tokens as per transloading requirements, which may include the mode of shipment and their respective carriers. Financing offers and requests in the marketplace include in-transit freight finance offered to buyers. In collecting payments, the supplier makes a claim to the buyer on shipped goods, goods for transloading are separated and transferred to different modes of transportation, a carrier's (or carriers') goods are warehoused, the buyer receives the goods, the goods are inspected for quality against the purchase order, the buyer makes acceptance of goods after being verified, and the corporate buyer further ships goods and invoices its customers. Also, funders are settled first.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of creating and using a digital token by compute nodes of a computer system to perform a transaction, wherein the transaction is completed on behalf of a first financial institution and a second financial institution, said method comprising:

creating by a source compute node, the digital token based on asset data that the digital token represents, wherein the creating of the digital token includes storing a token type in a programmable field of the digital token, and each of different token types are associated with one of a plurality of policy contracts;

transmitting the digital token by the source compute node across a network to a first destination compute node, wherein the first destination compute node executes on behalf of the first financial institution;

in response to receiving the digital token, determining by the first destination compute node, the token type from the programmable field, and then identifying by the first destination compute node, a policy contract based on an association between the token type and the policy contract, wherein the policy contract includes a sub-token rule for creating a sub-token representing partial ownership of the digital token, and the policy contract further includes a routing rule for routing the sub-token;

splitting the digital token by the first destination compute node by creating the sub-token according to the sub-token rule of the identified policy contract, and then routing the sub-token by the first destination compute node across the network to a second destination compute node according to the routing rule of the identified policy contract, wherein the second destination compute node executes on behalf of the second financial institution; and updating by the first destination compute node, a record that is maintained at the first destination compute node to indicate the splitting of the digital token.

2. The method of claim 1, wherein the network is a distributed ledger network, and the updating of the record maintained at the first destination compute node causes replication of the update at other compute nodes of the computer system to records maintained at the other compute nodes.

3. The method of claim 1, further comprising:

accepting the sub-token by the second destination compute node, and then updating by the second destination compute node, a record maintained at the second destination compute node to indicate that the second financial institution owns the sub-token.

4. The method of claim 1, wherein the digital token is an approved payable draft (APD), and the sub-token is a portion of the APD.

5. The method of claim 1, wherein the digital token is a future-forward contract (FFC), and the sub-token is a portion of the FFC.

6. The method of claim 1, wherein the digital token is a trade receivables securitization (TRC), and the sub-token is a portion of the TRC.

7. The method of claim 1, wherein the sub-token is associated with a due date for payment of an obligation, and further associated with a discount rate to be applied in response to early payment of the obligation.

8. The method of claim 1, wherein at least one of the first and second financial institutions is a bank.

\* \* \* \* \*